(12) United States Patent
Nishide

(10) Patent No.: US 7,889,272 B2
(45) Date of Patent: Feb. 15, 2011

(54) IMAGING APPARATUS, HIGH FREQUENCY COMPONENT DETECTION CIRCUIT, HIGH FREQUENCY COMPONENT DETECTION METHOD AND COMPUTER PROGRAM PRODUCT

(75) Inventor: Yoshiaki Nishide, Osaka (JP)

(73) Assignee: Sony Corporation, Tokyo (JP)

( * ) Notice: Subject to any disclaimer, the term of this patent is extended or adjusted under 35 U.S.C. 154(b) by 992 days.

(21) Appl. No.: 11/729,607

(22) Filed: Mar. 29, 2007

(65) Prior Publication Data

US 2007/0229675 A1 Oct. 4, 2007

(30) Foreign Application Priority Data

Mar. 31, 2006 (JP) .......................... P2006-099644

(51) Int. Cl.
*H04N 3/27* (2006.01)
(52) U.S. Cl. ...................... 348/354; 348/355; 348/241
(58) Field of Classification Search ................ 348/345, 348/354–356, 234, 272–273, 241
See application file for complete search history.

(56) References Cited

U.S. PATENT DOCUMENTS

| 6,088,060 A * | 7/2000 | Suda et al. .................. 348/350 |
| 6,972,798 B1 * | 12/2005 | Takei ......................... 348/349 |
| 7,616,252 B2 * | 11/2009 | Ito et al. ..................... 348/345 |

FOREIGN PATENT DOCUMENTS

| JP | 5-344346 | 12/1993 |
| JP | 7-209576 | 8/1995 |
| JP | 9-91420 | 4/1997 |
| JP | 2000-22992 | 1/2000 |
| JP | 2001-78057 | 3/2001 |
| JP | 2002-278500 | 9/2002 |
| JP | 2003 242504 | 8/2003 |
| JP | 2004 282686 | 10/2004 |
| JP | 2007 266956 | 10/2007 |

\* cited by examiner

*Primary Examiner*—Tuan Ho
(74) *Attorney, Agent, or Firm*—Frommer Lawrence & Haug LLP; William S. Frommer; Ellen Marcie Emas

(57) ABSTRACT

A high frequency component detection circuit detecting a high frequency component included in a video signal is provided. The high frequency component detection circuit includes a filter acquiring a group of a predetermined number of pixels including a focused pixel and pixels surrounding the focused pixel with respect to each of pixels constituting the video signal, rearranging the pixels constituting the group to be arrayed in the order of luminance values, determining the luminance value of the pixel positioned at the center in the rearranged order, and outputting the pixel positioned at the center among the rearranged pixels arrayed in the order of luminance values as the focused pixel. Further, the high frequency component detection circuit includes a detection circuit detecting a high frequency component included in the video signal based on the output from the filter.

10 Claims, 7 Drawing Sheets

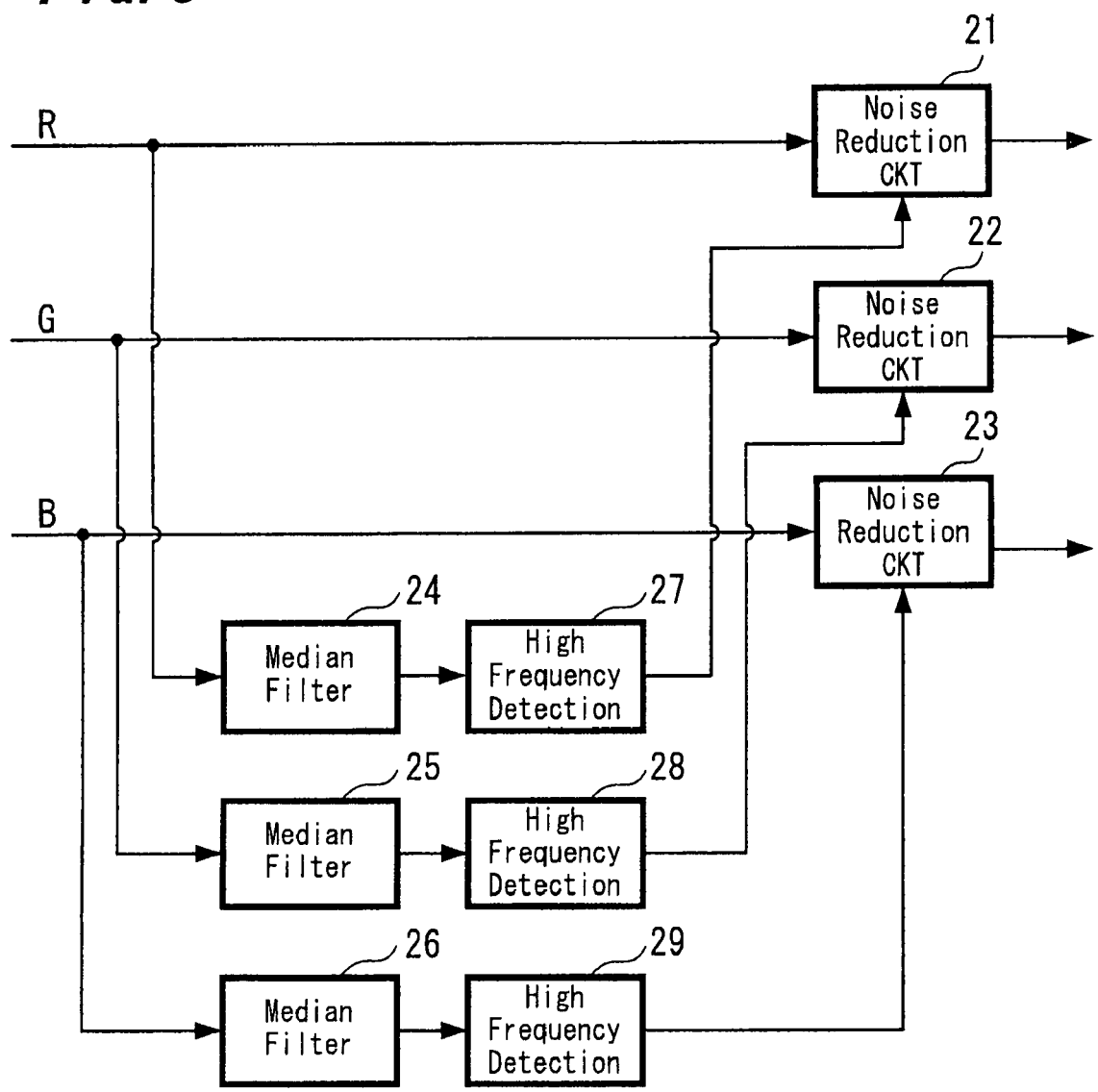

IMAGING APPARATUS, HIGH FREQUENCY COMPONENT DETECTION CIRCUIT, HIGH FREQUENCY COMPONENT DETECTION METHOD AND COMPUTER PROGRAM PRODUCT

CROSS REFERENCES TO RELATED APPLICATIONS

The present invention contains subject matter related to Japanese Patent Application JP 2006-099644 filed in the Japanese Patent Office on Mar. 31, 2006, the entire contents of which being incorporated herein by reference.

BACKGROUND OF THE INVENTION

1. Field of the Invention

The present invention relates to an imaging apparatus, a high frequency component detection circuit, a high frequency component detection method and a computer program product. Particularly, the present invention relates to technologies applied to the imaging apparatus, high frequency component detection circuit, high frequency component detection method and computer program product that detect a high frequency component included in a video signal and perform noise reduction processing and the like.

2. Description of the Related Art

In the past, in the case of removing noise included in a video signal, if a high frequency component included in the video signal was detected, such component was retained without removing the noise from a portion where the high frequency component was detected. Since the edge of images and the like are maintained by thus retaining the high frequency component, the picture quality can be maintained without deterioration caused by removing the noise.

FIG. 1 shows an example of configuration of a noise reduction circuit of this kind in related art. In this example, three primary color signals R (red), G (green) and B (blue) are supplied to a high-pass filter 98 and only high frequency components are extracted. The high frequency components extracted in the high-pass filter 98 are supplied to a noise reduction circuit 99 where noise reduction processing is not performed on portions detected to be the high frequency components, or processing of reducing the noise reduction effect or the like is performed thereon. A high-pass filter passing only a signal component having a frequency equal to or higher than a predetermined high frequency can be applied as the high-pass filter 98, for example.

Noise reduction processing is thus controlled based on the detection of a high frequency component, and therefore a high frequency signal component such as the edge of an image can be maintained after removing the noise.

Japanese Unexamined Patent Application Publication No. 2003-242504 discloses noise reduction processing corresponding to a luminance level.

SUMMARY OF THE INVENTION

If the noise reduction processing is performed based on the above-described detection of a high frequency signal component, a noise component may affect the result of the high frequency detection and consequently prevent a high frequency component detection result from being obtained correctly. Particularly, if the noise is large in amount, it is difficult to discern detecting a high frequency in the image from detecting the noise itself.

There has been known an impulse component that is one of noise components, and a median filter has been used as a filter to efficiently remove the impulse component and the like. Japanese Unexamined Patent Application Publication No. 2003-242504 discloses a configuration using the median filter in which an unnecessary component included in a video signal is directly removed.

However, the median filter may also change a high frequency component characteristic as well as the impulse component. Particularly, a phenomenon called an edge shift may occur at the edge, causing such a problem as losing the smoothness thereof. Therefore, filtering directly the actual video signal by using the median filter may cause a problem in view of picture quality.

It is desirable to detect a high frequency component and to perform processing based on the detection of the high frequency component excellently without deteriorating the picture quality.

According to an embodiment of the present invention, in the case of detecting a high frequency component from a video signal, the following processing is performed. Specifically, a group of a predetermined number of pixels including a focused pixel and pixels surrounding the focused pixel is acquired with respect to each of pixels constituting the video signal. The pixels constituting the group are rearranged to be arrayed in the order of luminance values. The luminance value of the pixel positioned at the center in the rearranged order is determined. A median filter, outputting the pixel positioned at the center among the rearranged pixels arrayed in the order of luminance values as the focused pixel, is used to detect a high frequency component included in the video signal based on an output from the filter.

As described above, the median filter is used to obtain a signal for detecting a high frequency component, and the high frequency component is detected from the signal having an impulse component removed in the median filter.

According to an embodiment of the present invention, since the median filter is used to obtain the signal for detecting the high frequency component and the high frequency component is detected from the signal having the impulse component removed in the median filter, a high frequency component without an influence of the impulse component such as noise can be detected accurately.

BRIEF DESCRIPTION OF THE DRAWINGS

FIG. 3 is a diagram showing an example of a noise reduction circuit in the video camera shown in FIG. 2;

DESCRIPTION OF THE PREFERRED EMBODIMENTS

A first embodiment of the present invention is hereinafter explained by referring to FIGS. 2 to 6.

Figure 1:
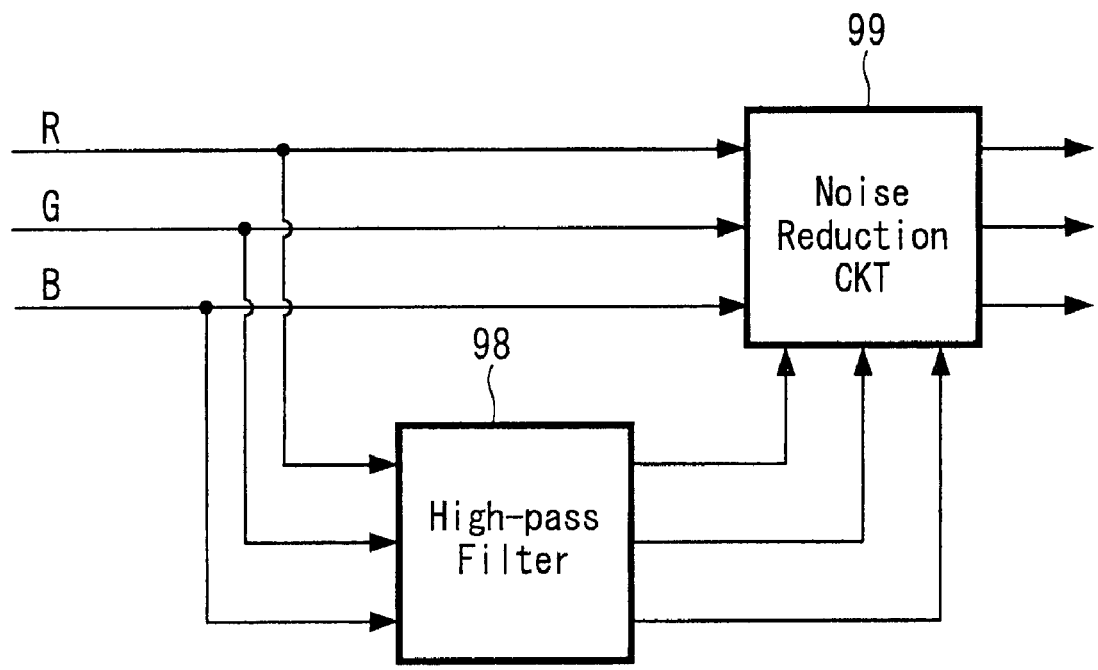
FIG. 1 is a diagram showing an example of noise reduction processing in related art.
Figure 2:
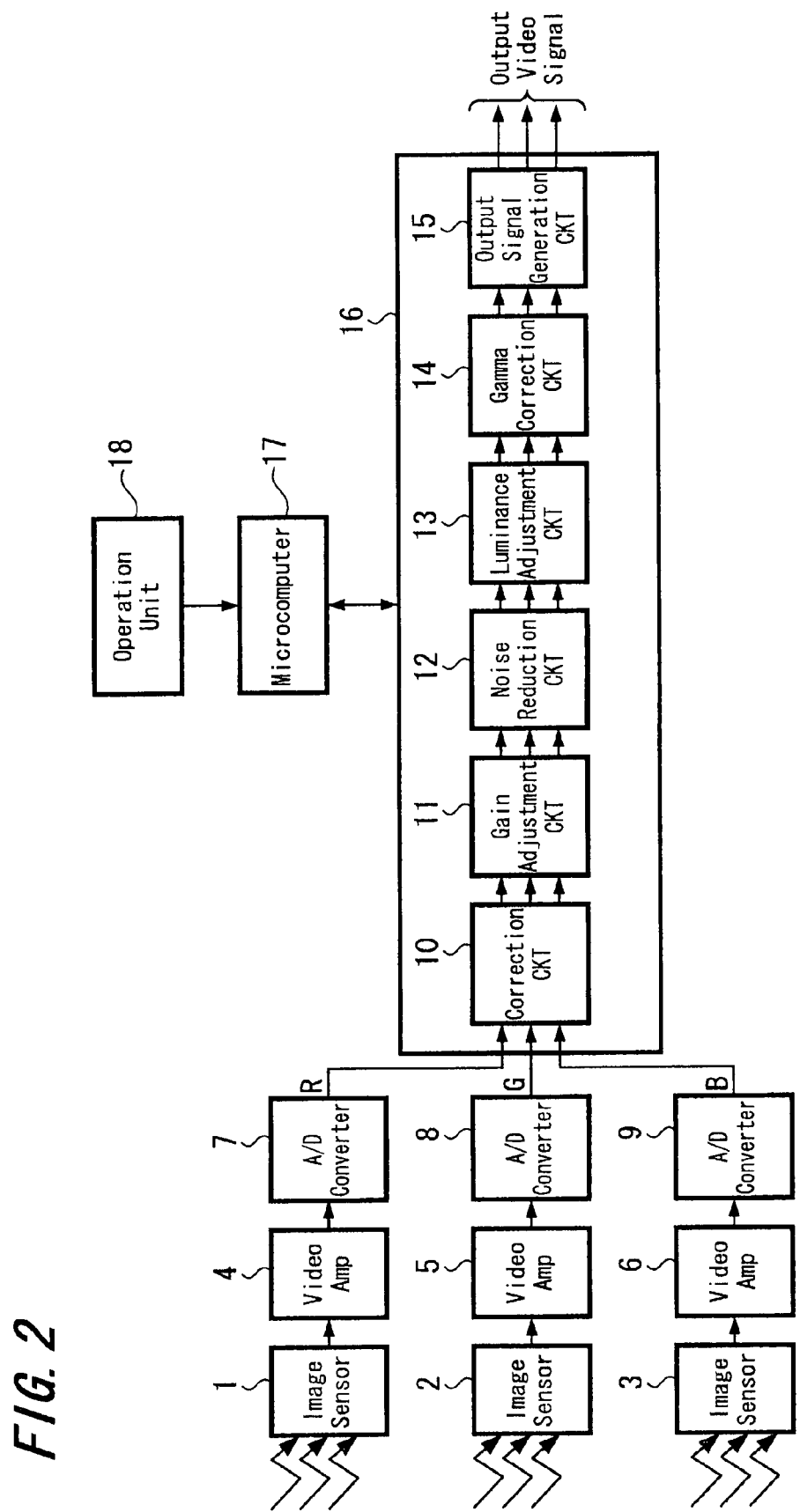
FIG. 2 is a block diagram showing an example of configuration of a video camera according to a first embodiment of the present invention.

FIG. 2 is a block diagram showing a basic configuration of a video camera to which an imaging apparatus according to an embodiment of the present invention is applied. Filters to resolve an optical image captured by a lens (not illustrated) into three primary color images of red (R), green (G) and blue (B) are mounted in the video camera shown in FIG. 2 prior to three image sensors 1, 2 and 3, each of which includes an imaging device using CCD (Charge Coupled Device) and the like. Subject image light is incident on light receiving portions of the image sensors 1, 2 and 3 via the filters after passing through an optical system such as a lens not illustrated, and a photoelectric conversion is performed on red, green and blue images, separately. Although three image sensors for red, green and blue are provided in this embodiment, it should be appreciated that image sensors corresponding to, for example, four colors, may be provided without limiting to this embodiment.

The image sensors 1, 2 and 3 perform the photoelectric conversion and generate primary color signals forming video signals from the subject image, respectively, and subsequently supply the three primary color signals (signal R, signal G and signal B) to video amplifiers 4, 5 and 6, respectively. It should be noted that the above-described video signals can be applied to a still image, as well as a moving image.

The video amplifiers 4, 5 and 6 are gain adjusters, and AGC (Automatic Gain Control) circuits or the like can be applied, for example. The video amplifiers 4, 5 and 6 adjust gains of the primary color signals, and supply the gain-adjusted primary color signals to A/D converters 7, 8 and 9, respectively. The A/D converters 7, 8 and 9 convert input analog signals into digital signals supplied to a video signal processing unit 16.

The video signal processing unit 16 according to this embodiment includes a correction circuit 10, a gain adjustment circuit 11, a noise reduction circuit 12, a luminance adjustment circuit 13, a gamma correction circuit 14 and an output signal generation circuit 15. First, the primary color signals R, G and B adjusted and quantized to appropriate levels by using the above-described video amplifiers 4, 5, 6 and A/D converters 7, 8, 9 are input into the correction circuit 10 in the video signal processing unit 16.

The correction circuit 10 performs signal processing such as interpolation processing with filter processing and shading processing on the input three primary color signals supplied to the gain adjustment circuit 11.

The gain adjustment circuit 11 adjusts gains of the three primary color signals input from the correction circuit 10 to appropriate levels, and supplies the adjusted three primary color signals to the noise reduction circuit 12.

The noise reduction circuit 12 reduces noise included in the three primary color signals input from the gain adjustment circuit 11, and supplies the noise-reduced output signals to the luminance adjustment circuit 13. The noise reduction circuit 12 according to this embodiment is later described in detail.

The luminance adjustment circuit 13 extracts luminance signals from the primary color signals input from the noise reduction circuit 12 so that video signals fall in a predetermined range, controls an amplitude characteristic of the luminance signals in a high luminance region to narrow a dynamic range of the output from each image sensor, and supplies the primary color signals to the gamma correction circuit 14.

The gamma correction circuit 14 performs correction corresponding to a gamma characteristic of a monitor (receiver) such as CRT (Cathode Ray Tube) and liquid crystal display panel on each of the three primary color signals input from the luminance adjustment circuit 13, and supplies the gamma-corrected primary color signals to the output signal generation circuit 15.

The output signal generation circuit 15 converts the three primary color signals input from the gamma correction circuit 14 into an ultimate video signal output format and outputs the converted primary color signals to the outside. For example, the output signal generation circuit 15 has a function of serving as an encoder converting the three primary color signals into color-difference signals and modulating the color-difference signals by using sub-carrier signals (not illustrated) to conform to NTSC (National Television System Committee) standard, PAL (Phase Alternating Line) standard, or the like. Further, in the case where video signals should be output as analogue signals, the output signal generation circuit 15 includes a D/A converter that converts quantized color-difference signals output from the above-described encoder circuit into analogue signals.

A microcomputer 17 is an example of a control unit that controls respective circuits constituting the video signal processing unit 16. Further, the microcomputer 17 controls operation of an optical system such as a lens (not illustrated) and operations of the video amplifiers 4, 5 and 6. An operation unit 18 includes button keys provided on the video camera, soft keys allocated to icons displayed on a monitor screen mounted on the video camera, and the like, inputting an operation signal corresponding to such operation to the microcomputer 17 from the operation unit 18 via an interface not illustrated. The microcomputer 17 performs predetermined operations and control on each circuit using a computer program stored in a non-volatile memory unit such as an internal ROM (Read Only Memory) based on an operation signal input by a user operating the operation unit 18, or based on predetermined settings defined in advance and the like.

Further, the microcomputer 17 connects to a drive circuit (not illustrated) according to need, reads computer programs from a magnetic disk, optical disk, magneto-optical disk, semiconductor memory, or the like suitably mounted thereto, and installs the programs in RAM incorporated in the microcomputer 17 as needed.

As described above, photoelectric conversion is performed on a subject image in the image sensors 1, 2 and 3 to generate primary color signals of red (R), green (G) and blue (B), subsequently, the generated primary color signals are adjusted and quantized to analogue signals at appropriate levels, and converted into digital signals using the video amplifiers 4, 5, 6 and A/D converters 7, 8, 9 in the video camera. Appropriate correction and gain adjustment processing are performed on each of the quantized primary color signals in the correction circuit 10 and gain adjustment circuit 11, and subsequently, each primary color signal is input into the noise reduction circuit 12. An impulse component in each of the primary color signals input into the noise reduction circuit 12 is mainly detected and removed with predetermined arithmetic processing to reduce noise, and the noise-reduced signals are input into the luminance adjustment circuit 13. Then, after appropriate luminance reducing processing is performed in the luminance adjustment circuit 13, the primary color signals are input into the gamma correction circuit 14.

The gamma-corrected primary color signals are converted into ultimate video signal output format signals output from the output signal generation circuit 15.

FIG. 3 shows an example of configuration of the noise reduction circuit 12 shown in FIG. 2. The primary color signals input into the noise reduction circuit 12 are supplied to separate noise reduction circuits 21, 22 and 23, respectively. The noise reduction processing in each of the noise reduction circuits 21, 22 and 23 is controlled respectively by the outputs from high frequency detection circuits 27, 28 and 29.

In addition, the noise reduction circuit 12 includes three median filters 24, 25 and 26, and is configured to supply the primary color signals input into the noise reduction circuit 12 to the separate median filters 24, 25 and 26 respectively, where median processing is performed. The median filters rearrange the input signals and output a value positioned in the center of the rearranged signals as newly prepared data, and the median filter processing is herein performed on 3×3 pixels, that is, nine pixels in total. Subsequently, the outputs of the median filters 24, 25 and 26 are supplied to the high frequency detection circuits 27, 28 and 29 respectively, where components having a predetermined frequency or higher are detected from the outputs of the median filters. High-pass filters are used for the processing of detecting the high frequency components in respective high frequency detection circuits 27, 28 and 29, for example.

The high frequency components of the video signals detected in the high frequency detection circuits 27, 28 and 29 are supplied to the noise reduction circuits 21, 22 and 23 for respective colors. According to this embodiment, the noise reduction processing in each of the noise reduction circuits 21, 22 and 23 is not performed on the portions in which the high frequency components are detected in the high frequency detection circuits 27, 28 and 29, and the noise reduction processing is performed solely on the other portions. Alternatively, the noise reduction processing in each of the noise reduction circuits 21, 22 and 23 is performed in a limited state on the portions where the high frequency components have been detected, and only comparatively weak noise reduction processing may be performed.

Figure 4A:
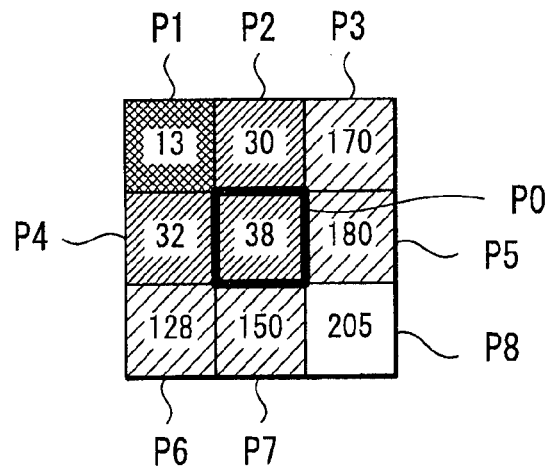
FIGS. 4A to 4C are explanatory diagrams showing a state of processing in a median filter according to the first embodiment of the present invention.
Figure 4B:
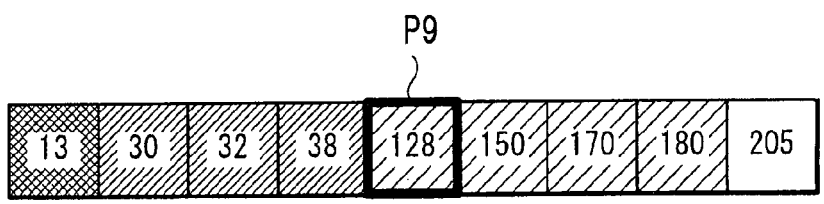
Figure 4C:

FIGS. 4A to 4C are diagrams showing an example of the operation of respective median filters 24, 25 and 26. As shown in FIG. 4A, upon setting a focused pixel P0 on which the noise reduction processing is performed, nine pixels including the focused pixel P0 and adjacent eight pixels P1 through P8 surrounding the focused pixel P0 are sampled. Respective values shown in the pixels are luminance values thereof. As shown in FIG. 4B, the nine pixels are rearranged in the order of luminance values after the nine pixels are thus sampled. Subsequently, the luminance value of the pixel P9 positioned at the center among those pixels is sampled from the array rearranged in the order of luminance values, and as shown in FIG. 4C, the luminance value of the pixel P9 positioned at the center is selected as an output value Pout of the focused pixel P0 after the filter processing.

An impulse component included in a video signal is thus removed by processing using the median filter. Subsequently, the high frequency component is detected from the signal whose impulse component has been removed. Therefore, the high frequency component alone can be detected excellently from an image without the impulse component that is the noise component being mixed in the detected high frequency component. Further, the noise reduction processing is controlled based on the detection of the high frequency component thus performed, thereby preventing limitation on the noise reduction processing from being applied to an interval where the impulse component is included, enabling the excellent noise reduction processing to be performed and improving the noise reduction performance. In addition, the median filter processing according to this embodiment is the processing of obtaining the signal to control the noise reduction processing, and the median filter processing is not performed on the video signal that is finally output. Therefore, such problem as the edge shift that is inherent to the median filter processing can be avoided.

There have been known some disadvantages in median filtering. For example, when removing a impulse component, it is difficult to distinguish whether the impulse component is originated from an image or noise, and there is a possibility that the median filter greatly affects a high frequency component other than the impulse component.

The median filter including measures to solve such problems may be used for each of the median filters 24, 25 and 26 described in FIG. 3. The median filter having such measures (hereinafter, this filter is called an impulse detecting median filter) is described in the followings.

Figure 5:
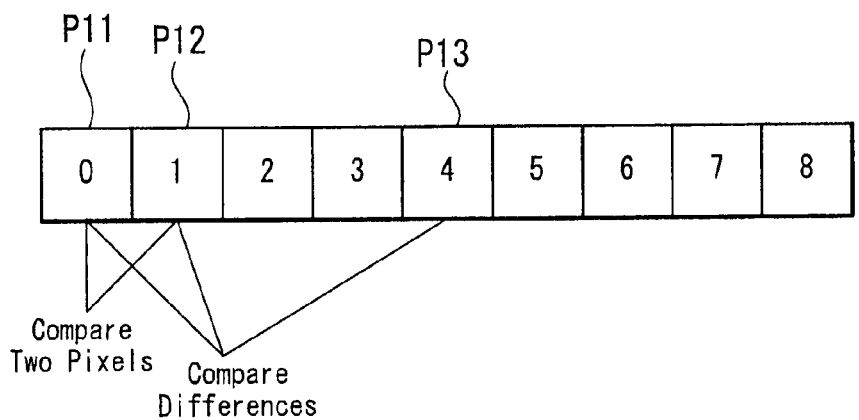
FIG. 5 is an explanatory diagram showing a state of processing that removes an impulse component in the median filter according to the first embodiment of the present invention.

FIG. 5 shows an operational principle of the impulse detecting median filter in this case. Assuming that each median filter is a circuit to sample nine pixels, the luminance values of the nine pixels input into the median filter are rearranged in the order of luminance values. FIG. 5 shows the result of the rearrangement. The pixel located in the center before the rearrangement is set as a focused pixel P11, and the pixel rearranged at the position in the center is set as a pixel P13 having a median value. Further, the pixel arrayed at a predetermined position (here, the second position from one end) on the side where the rearranged focused pixel P11 is located (the side having smaller luminance values or the side having larger luminance values) viewing from the pixel P13 having the median value is set as a compared pixel P12. Although the focused pixel P11 is rearranged to be located at the left end according to this embodiment, the rearranged position (or, whether the rearrangement is carried out or not) depends on the luminance thereof.

Subsequently, whether the median value represents the impulse component or not is judged by comparing the luminance value of the rearranged focused pixel P11 with that of the compared pixel P12, and comparing a difference between the luminance value of the focused pixel P11 and that of the compared pixel P12 (distance between both the pixels) with a difference between the luminance value of the compared pixel P12 and that of the pixel P13 having the median value (distance between both the pixels).

Specifically, the impulse component is detected by using the rearranged position (order) of the focused pixel P11, the distance from the focused pixel 11 to the compared pixel P12 and the distance from the focused pixel 11 to the median value P13.

Next, an example of processing in the impulse detecting median filter according to this embodiment is described with reference to a flow chart shown in FIG. 6. First, the luminance value of the focused pixel and the median value are compared (step S11). Here, it is judged whether the luminance value of the focused pixel is smaller than the median value (step S12). If the luminance value of the focused pixel is judged to be smaller than the median value, the luminance value of the focused pixel is compared with a smaller compared value (step S13). In this comparison, it is judged whether the luminance value of the focused pixel is smaller than that of the compared pixel (step S14). If the luminance value of the focused pixel is judged to be smaller than that of the compared pixel, a difference between the luminance value of the compared pixel and that of the focused pixel (distance between both the pixels) and a difference between the luminance value of the compared pixel and the luminance value as the median value (distance between both the pixels) are calculated (step S15), and it is judged whether the difference between the luminance value of the compared pixel and that of the focused pixel is larger than the latter difference (step S16).

If the difference between the luminance value of the compared pixel and that of the focused pixel is judged to be larger in the above judgment, the luminance value of the focused pixel is replaced with the median value (step S17), and the replaced luminance value is output as the luminance value of the focused pixel (step S19). The state of judging the difference between the luminance value of the compared pixel and that of the focused pixel to be larger in step S16 corresponds to the state of having detected an impulse component, and the luminance value of the focused pixel is replaced with the median value in step S17 in the case of having detected the impulse component.

Further, if the luminance value of the compared pixel is judged to be larger than that of the focused pixel in step S14 and if the difference between the luminance value of the compared pixel and that of the focused pixel is judged to be smaller in step S16, it is judged that the high frequency component is not the impulse component, and the luminance value of the focused pixel remains unchanged (step S18) to be output in step S19.

In addition, in the case where the luminance value of the focused pixel is judged to be larger than the median value in step S12, the luminance value of the focused pixel and a larger compared value are compared (step S21). In this comparison, it is judged whether the luminance value of the focused pixel is larger than that of the compared pixel (step S22). If the luminance value of the focused pixel is judged to be larger than that of the compared pixel, a difference between the luminance value of the compared pixel and that of the focused pixel (distance between both the pixels) and a difference between the luminance value of the compared pixel and the luminance value as the median value are calculated (distance between both the pixels) (step S23). Then, it is judged whether the difference between the luminance value of the compared pixel and that of the focused pixel is larger than the latter difference (step S24).

If the difference between the luminance value of the compared pixel and that of the focused pixel is judged to be larger in the above judgment, the luminance value of the focused pixel is replaced with the median value (step S25), and the replaced luminance value is output as the luminance value of the focused pixel (step S19). The state of judging the difference between the luminance value of the compared pixel and that of the focused pixel to be larger in step S24 corresponds to the state of having detected the impulse component, and the luminance value of the focused pixel is replaced with the median value in step S25, in the case of having detected the impulse component.

Further, if the luminance value of the compared pixel is judged to be larger than that of the focused pixel in step S22 and if the difference between the luminance value of the compared pixel and that of the focused pixel is judged to be smaller in step S24, it is judged that the high frequency component is not the impulse component, and the luminance value of the focused pixel remains unchanged (step S26) to be output in step S19.

As described above, whether the focused pixel represents an impulse component is judged by using the rearranged position (order) thereof, the distance (difference) from the compared pixel and the distance (difference) from the median value, thereby accurately judging the impulse component. In the case where the focused pixel is the impulse component, it is rare that an impulse component having a value equal to or larger than the focused pixel exists in the nine pixels. In the case where, on the contrary, similar pixels exist, it is difficult to judge whether the focused pixel is noise or an image. Accordingly, when judging whether the focused pixel is the impulse component, a limitation is added to judgment criteria in view of the focused pixel being the minimum or maximum. However, such limitation alone may not prevent the replacement occurred in a flat portion and thin straight line that include comparatively similar pixels. Therefore, as shown in the flow chart of FIG. 6, it is further judged whether the difference value between the compared pixel and the focused pixel is larger than the difference value between the compared pixel and the median value. Consequently, the impulse component included in the comparatively flat portion can also be detected.

It should be noted that in the case where two impulse components are removed in 3×3 pixels, that is, nine pixels, restriction on the focused pixel is lessened to include the minimum value and adjacent pixel thereof or the maximum value and adjacent pixel thereof. In addition, if the compared pixel is selected from the pixels closer to the median value than the example shown in FIG. 5, the conditions can be changed similarly. Furthermore, a method of obtaining the compared pixel from a mean value of the pixels may be available in order to eliminate the influence of noise as much as possible.

Figure 6:
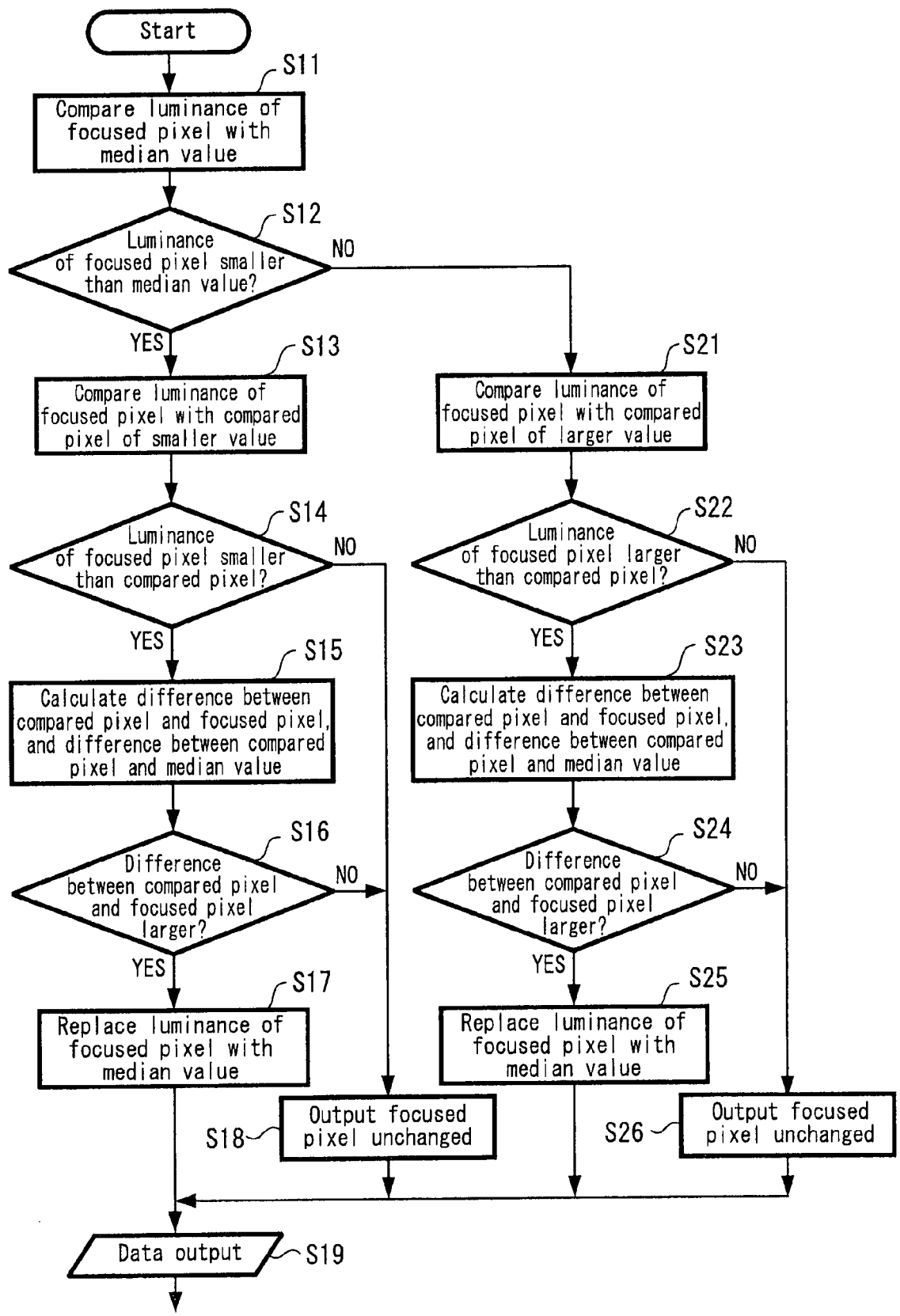
FIG. 6 is a flow chart showing an example of processing that detects an impulse component according to the first embodiment of the present invention.

The impulse detecting median filter that performs processing shown in the flow chart of FIG. 6 is used as each of the median filters 24, 25 and 26 included in the noise reduction circuit shown in FIG. 3, thereby removing only the impulse components surely in the median filters and enabling the detection of the high frequency component to be performed excellently in the circuit at the subsequent stage.

Figure 7:
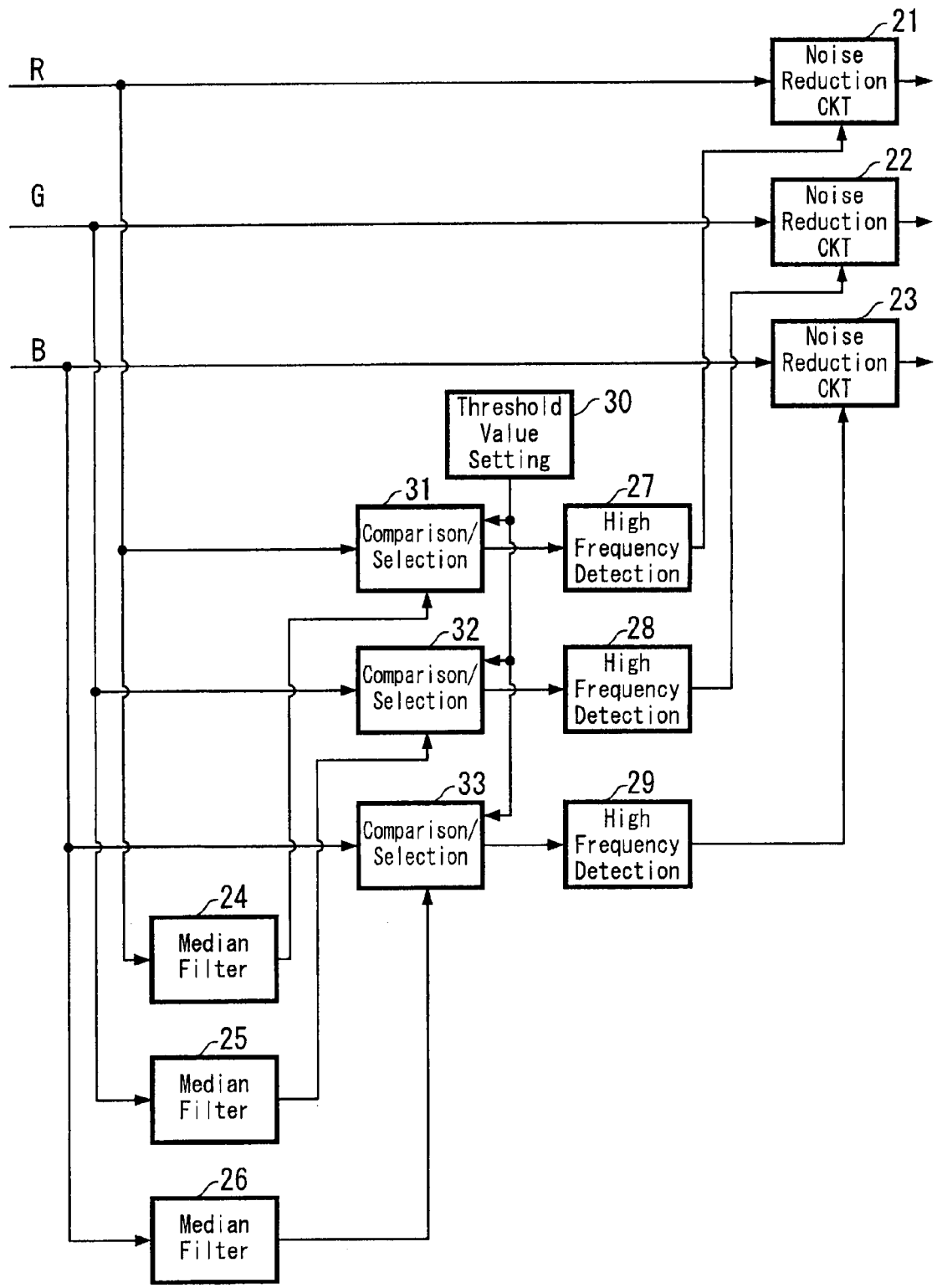
FIG. 7 is a diagram showing an example of a noise reduction circuit according to a second embodiment of the present invention.
Figure 8:
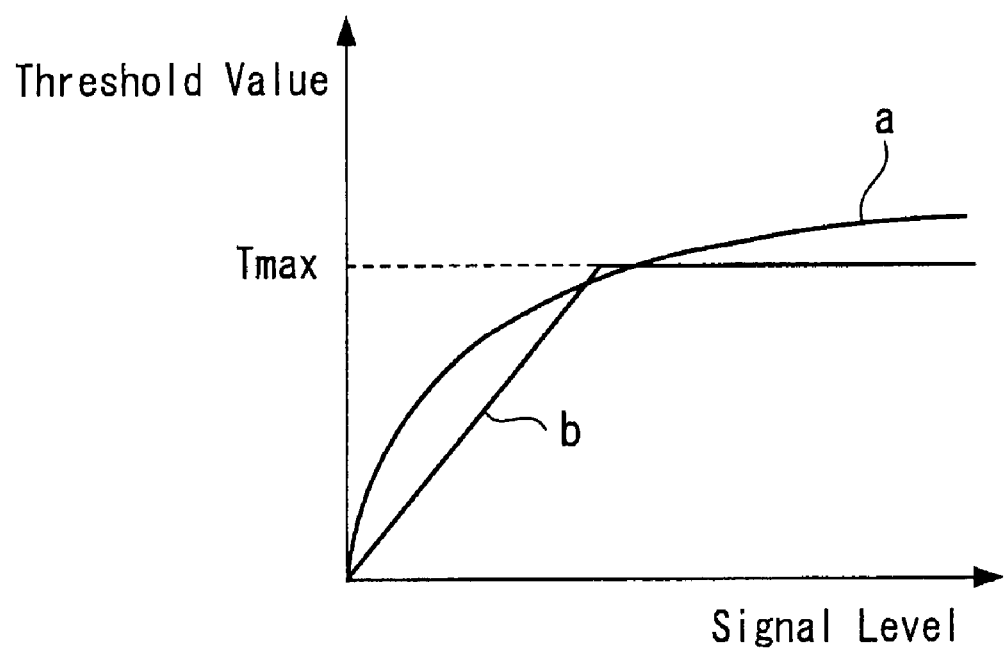
FIG. 8 is a characteristic curve showing a relationship between an example of a threshold value changed and a light shot noise in FIG. 7.

Next, a second embodiment of the present invention is described with reference to FIGS. 7 and 8. As shown in FIGS. 7 and 8, the same reference numerals are given to units corresponding to those in FIGS. 2 and 3 which are described in the first embodiment.

Similarly to the first embodiment, this embodiment is also applied to a video camera and the configuration of the video camera as a whole is similar to that shown in FIG. 2 that is already described. Further, this embodiment includes the noise reduction circuit 12 in FIG. 2 to be configured as shown in FIG. 7, and the other units are configured similarly to those described in FIG. 2.

The noise reduction circuit according to this embodiment performs threshold processing in combination with the median filtering that detects the high frequency component of the video signal. Specifically, only the impulse component at a certain level or lower is removed by the impulse detecting median filter, and other than that, an original signal is selected so that the high frequency component is detected from the selected signal to control the noise removing processing. FIG. 7 shows the configuration of the noise reduction circuit according to this embodiment. As shown in FIG. 7, primary color signals input into the noise reduction circuit 12 are supplied to the separate noise reduction circuits 21, 22 and 23, respectively. The noise reduction processing in each of the noise reduction circuits 21, 22 and 23 is controlled by the outputs from the high frequency output circuits 27, 28 and 29, respectively.

In addition, the noise reduction circuit 12 includes the three median filters 24, 25 and 26, and the primary color signals input into the noise reduction circuit 12 are supplied to the separate median filters 24, 25 and 26 respectively where the median filter processing is performed. The impulse detecting median filter described in the flow chart of FIG. 6 may be used as well as the median filter that rearranges input signals and outputs the value at the position in the middle as a newly prepared data.

The outputs from the median filters 24, 25 and 26 are supplied to comparing and selecting circuits 31, 32 and 33 respectively that perform the threshold processing. The original signal and the output from the median filter are compared individually for each of the primary colors using a threshold value set by a threshold value setting circuit 30 in the comparing and selecting circuits 31, 32 and 33, and either the original signal or the median filter output is selected to be output depending on whether a difference is equal to or larger than the threshold value. More specifically, the differences between the signals generated in the impulse detecting median filters 24, 25 and 26 and the original signals are compared in the comparing and selecting circuits 31, 32 and 33, respectively. If the difference is larger than the set threshold value, the original signal is output, and if the difference is smaller than the set threshold value, the median filtering result is output.

Subsequently, the outputs from the comparing and selecting circuits 31, 32 and 33 are supplied to high frequency detection circuits 27, 28 and 29, where high frequency components of a predetermined frequency or higher are detected from the median filter outputs.

After that, the high frequency components of video signals detected in the high frequency detection circuits 27, 28 and 29 are supplied to the noise reduction circuits 21, 22 and 23 for respective colors, and the noise reduction processing is controlled in the noise reduction circuits 21, 22 and 23 regarding the portions where the high frequency components have been detected in the high frequency detection circuits 27, 28 and 29. For example, the noise reduction processing is not performed on the portions where the high frequency components are detected, and the noise reduction processing is performed only on the other portions. As an alternative, the noise reduction processing is performed in the noise reduction circuits 21, 22 and 23 in a limited state on the portions where the high frequency components are detected, in other words, comparatively weak noise reduction processing may be performed.

It should be noted that simply performed switching, on the contrary, may generate noise in switching processing in the comparing and selecting circuits 31, 32 and 33. Therefore, alpha-blend processing of smoothly switching between original signals and median filter outputs based on the difference may be performed. The following formula 1 represents conditions applied to a specific processing example in the case of performing the alpha-blend processing, wherein $D_{in}$ represents the input signal, $D_{out}$ represents the output signal, Th represents the threshold value that is the pixel value (luminance value) 32 in this example.

$(Din-Dout) > Th$ $((Din-Dout)-Th) \times Din + (32-((Din-Dout)-Th)) \times Dout$ $32 > Din$ [Formula 1]

According to the processing as described above, the threshold processing combined with the median filtering enables highly accurate processing of detecting the high frequency component to be performed, and the high frequency component detected excellently in that processing is used to obtain the excellent noise removing processing.

In addition, since an image sensor with a smaller pixel size has been used, light shot noise that is generated by flickering of light has become main noise components. That noise component increases in proportion to the amount of incident light and becomes more prominent in brighter portions. Hence, the threshold processing may be varied corresponding to the input signal in order to deal with such noise. Accordingly, the light shot noise in the bright portion can be removed efficiently without impairing the reproducibility in dark portions. The following formula 2 represents an example of the threshold processing at that time.

$$Th = \begin{cases} T\max \ldots & [\text{Data} \geq 0 \ \& Th > T\max] \\ Scpu \times \text{Data} + Tcpu \ldots & [\text{Data} \geq 0 \ \& Th \leq T\max] \\ Tcpu \ldots & [\text{Data} < 0] \end{cases}$$ [Formula 2]

In the formula 2, Th represents the threshold value, Tmax represents the maximum value of the threshold value, Scpu represents an inclination of an amount of change in threshold value, Tcpu represents the threshold value when the input is 0, and Data represents input data. FIG. 8 shows this variable threshold processing. It is noticed that a threshold value change characteristic b is approximated to a light shot noise characteristic a. Other than the above, such processing as approximating the threshold value change characteristic b can be performed using a similar curve to the light shot noise characteristic a.

As described above, according to the first and second embodiments of the present invention, the high frequency component alone from which the impulse component has been removed can be detected accurately, thereby excellently removing noise based on the detection. In addition, in the case of combining the threshold processing with the median filtering as described in the second embodiment, the high frequency component can be detected from the resultant signal having removed only the impulse component representing noise, without affecting the impulse component included in the image having the contrast or the like. Accordingly, noise can be removed excellently in that case. Further, with the threshold value being varied according to the input signal, impulse noise such as the light shot noise dependent on the signal level can also be removed.

It should be noted that the processing in the noise reduction circuit 12 heretofore described can be executed with hardware, but the processing can also be executed using software. In the case where the series of processing is executed by means of software, a computer program constituting that software is stored in the memory unit such as a ROM incorporated in the microcomputer 17.

It should be appreciated that the above-described embodiments can also be implemented by supplying a recording medium having recorded program codes of the software to obtain the function according to the embodiments to the system or apparatus, and by reading and executing the program codes stored in the recording medium by a computer (arithmetic processing unit) of the system or apparatus.

A recording medium such as a floppy disk, hard disk, optical disk, magneto-optical disk, CD-ROM, CD-R, magnetic tape, non-volatile memory card, ROM, and the like, can be used as the recording medium to supply the program codes in this case.

In addition, the imaging apparatus according to an embodiment of the present invention is herein applied to a video camera as described above, however, the embodiment of the present invention can be widely applied to various apparatuses without limiting to the video camera, and may be applied to a digital still camera, color image scanner, or other apparatuses having an equivalent function, for example.

Furthermore, according to the above-described embodiments, the median filters are incorporated in the high frequency detection circuits included in the noise reduction circuit incorporated in the imaging apparatus, however, a high frequency detection circuit for video signals that is applied to other apparatuses than the imaging apparatus may be used in a similar configuration.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an imaging unit; and
   a video processing unit reducing noise of a video signal output from said imaging unit capturing an image;
      said video processing unit including
         a filter acquiring a group of a predetermined number of pixels including a focused pixel and pixels surrounding said focused pixel with respect to each of pixels constituting said video signal, rearranging the pixels constituting said group to be arrayed in the order of luminance values, determining the luminance value of the pixel positioned at the center in the rearranged order, and outputting said pixel positioned at the center among the rearranged pixels arrayed in said order of luminance values as said focused pixel,
         a detection circuit detecting a high frequency component included in the video signal based on the output from said filter, and
         a noise reduction circuit setting a noise reduction processing state on each pixel in accordance with a detected result of the high frequency component in the video signal output from said detection circuit.

2. An imaging apparatus according to claim 1, wherein said filter further performs:
   setting other pixels in a specific order than said pixel positioned at the center to compared pixels among the rearranged pixels arrayed in said order of luminance values;
   comparing the luminance value of said focused pixel and the luminance value of said compared pixels; and
   replacing the luminance value of said focused pixel with the luminance value of said pixel positioned at the center and outputting the replacing luminance value in the case of having a specific relationship corresponding to detection of an impulse component, and outputting the luminance value of said focused pixel unchanged in the case of not having said specific relationship.

3. An imaging apparatus according to claim 1, wherein
   said detection circuit further includes
   a selection unit comparing a difference between the luminance value output from said filter and the original luminance value of said focused pixel with a threshold value, selecting said original luminance value in the case of the difference being the set threshold value or more, and selecting the luminance value output from said filter in the case of the difference being smaller than said threshold value.

4. An imaging apparatus according to claim 3, wherein said threshold value is variably set in accordance with the original luminance value.

5. A high frequency component detection circuit detecting a high frequency component included in a video signal, comprising:
   a filter acquiring a group of a predetermined number of pixels including a focused pixel and pixels surrounding said focused pixel with respect to each of pixels constituting said video signal, rearranging the pixels constituting said group to be arrayed in the order of luminance values, determining the luminance value of the pixel positioned at the center in the rearranged order, and outputting said pixel positioned at the center among the rearranged pixels arrayed in said order of luminance values as said focused pixel, and
   a detection circuit detecting a high frequency component included in the video signal based on the output from said filter.

6. A high frequency component detection circuit according to claim 5, wherein
   said filter further performs:
   setting the other pixels in a specific order than said pixel positioned at the center to compared pixels among the rearranged pixels arrayed in said order of luminance values;
   comparing the luminance value of said focused pixel and the luminance value of said compared pixels; and
   replacing the luminance value of said focused pixel with the luminance value of said pixel positioned at the center and outputting the replacing luminance value in the case of having a specific relationship corresponding to a detection of an impulse component, and outputting the luminance value of said focused pixel unchanged in the case of not having said specific relationship.

7. A high frequency component detection circuit according to claim 5, wherein
   said detection circuit further includes
   a selection unit comparing a difference between the luminance value output from said filter and the original luminance value of said focused pixel with a threshold value, selecting said original luminance value in the case of the difference being the set threshold value or more, and selecting the luminance value output from said filter in the case of the difference being smaller than said threshold value.

8. A high frequency component detection circuit according to claim 7, wherein
   said threshold value is variably set in accordance with the original luminance value.

9. A method of detecting a high frequency component included in a video signal, comprising the steps of:
   acquiring a group of a predetermined number of pixels including a focused pixel and pixels surrounding said focused pixel with respect to each of pixels constituting said video signal;
   rearranging the pixels constituting said group to be arrayed in the order of luminance values;
   determining the luminance value of the pixel positioned at the center in the rearranged order;
   outputting said pixel positioned at the center among the rearranged pixels arrayed in said order of luminance values as said focused pixel; and
   detecting a high frequency component included in the video signal based on the output from said filter.

10. A computer program product, embodied on a non-transitory computer readable storage medium, causing a computer to execute processing of:
    detecting a high frequency component included in a video signal, acquiring a group of a predetermined number of pixels including a focused pixel and pixels surrounding said focused pixel with respect to each of pixels constituting said video signal, rearranging the pixels constituting said group to be arrayed in the order of luminance values, determining the luminance value of the pixel positioned at the center in the rearranged order, outputting said pixel positioned at the center among the rearranged pixels arrayed in said order of luminance values as said focused pixel, and detecting a high frequency component included in the video signal based on an output from said filter.

* * * * *